Aug. 9, 1932.  F. C. CRAWFORD  1,870,283
ADJUSTABLE TIE-ROD
Filed March 13, 1926  2 Sheets-Sheet 2
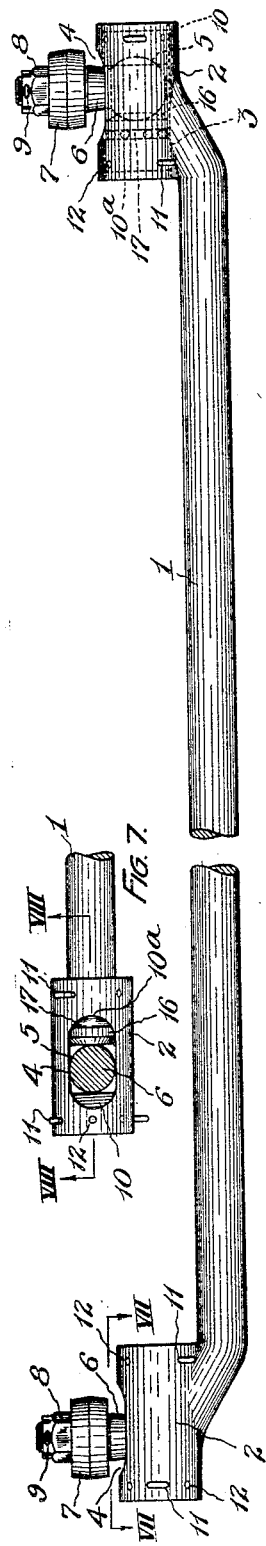
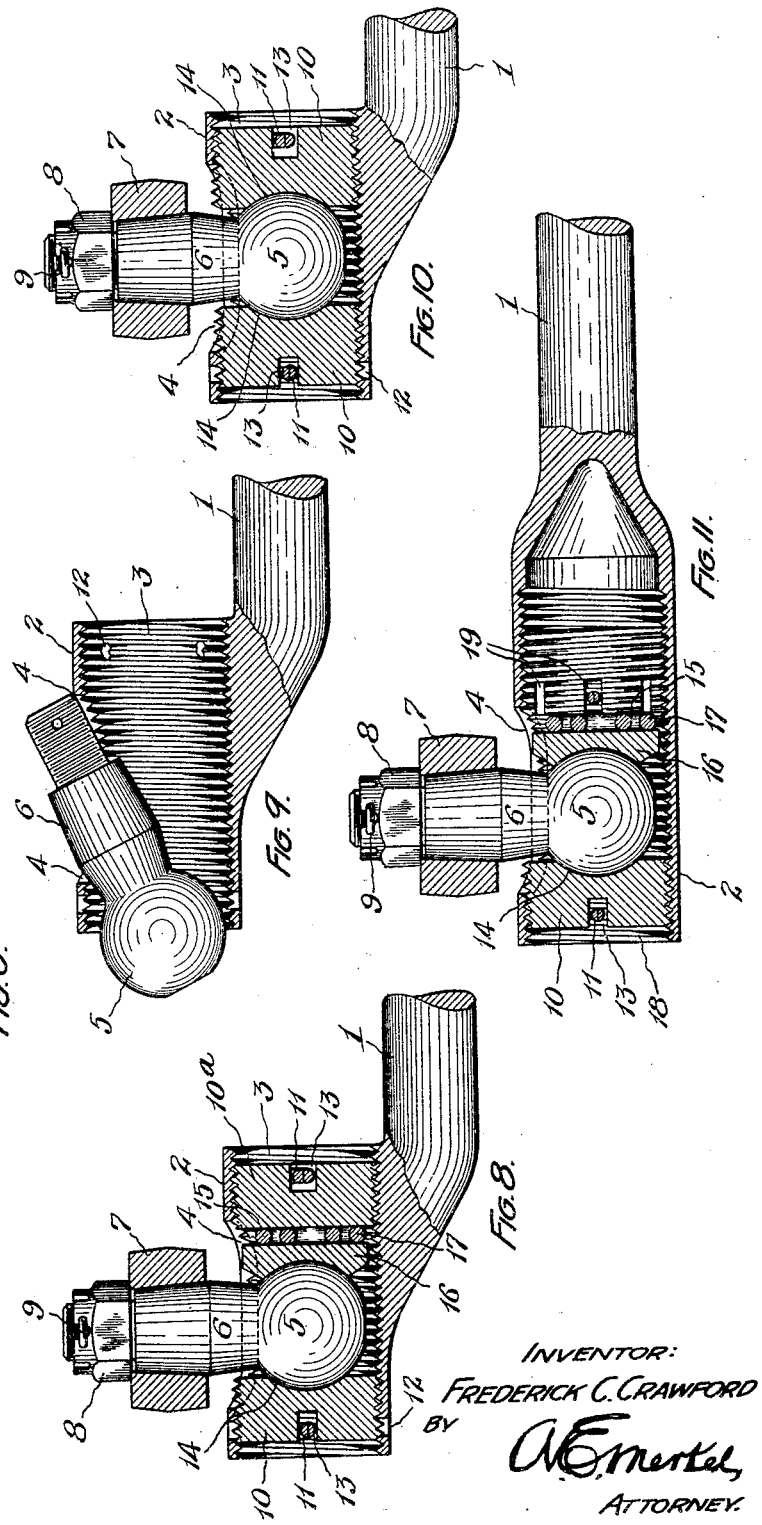
INVENTOR:
FREDERICK C. CRAWFORD
BY
A. E. Merkel,
ATTORNEY.

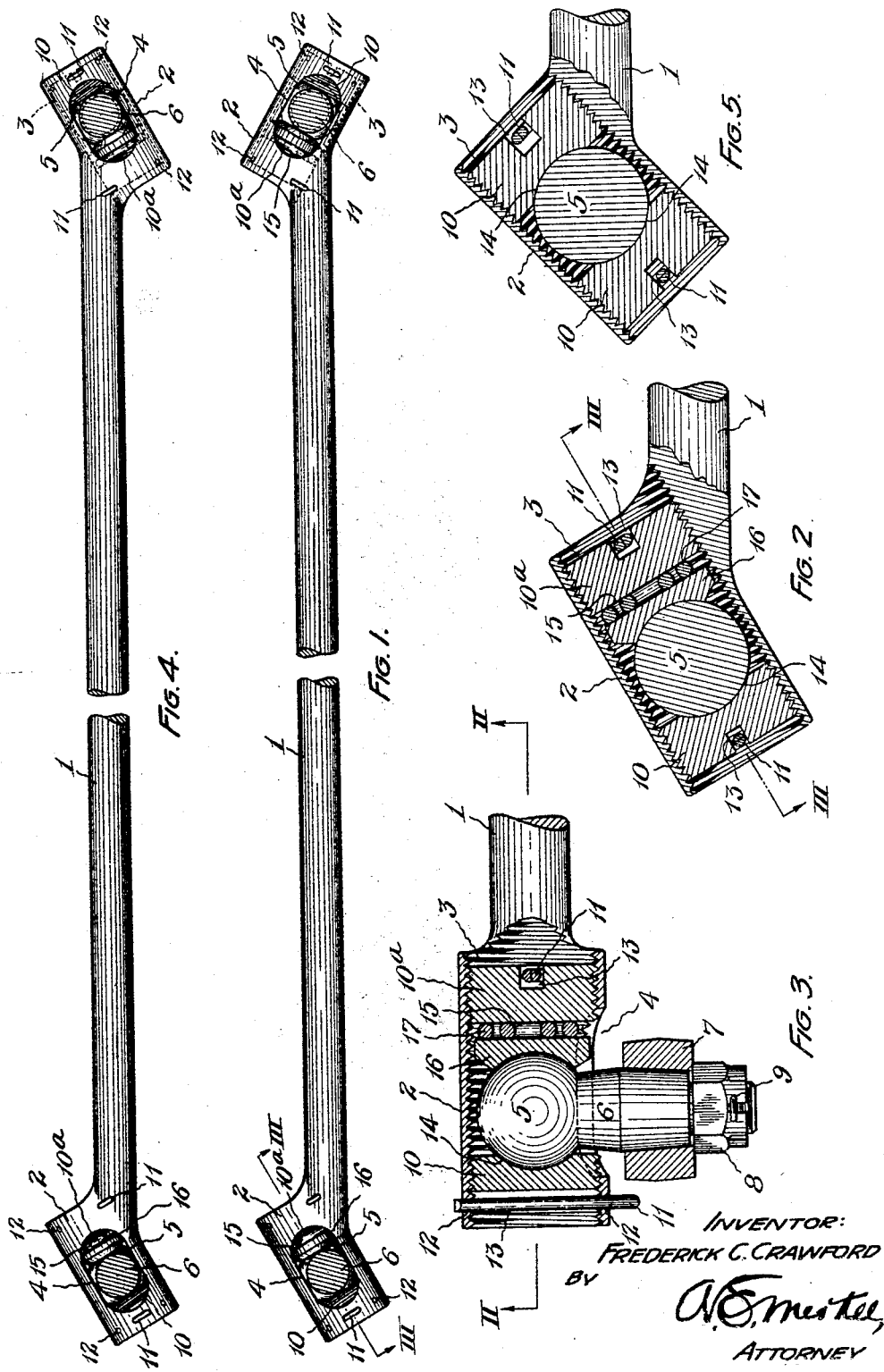

Patented Aug. 9, 1932

1,870,283

UNITED STATES PATENT OFFICE

FREDERICK C. CRAWFORD, OF DETROIT, MICHIGAN, ASSIGNOR TO THOMPSON PRODUCTS, INC., OF CLEVELAND, OHIO, A CORPORATION OF OHIO

ADJUSTABLE TIE-ROD

Application filed March 13, 1926. Serial No. 94,553.

This invention relates to connecting rods and rod couplings, such as tie rods and drag links for automobiles, and in its more specific form, especially to tie rods. The tie rod of an automobile is that rod which connects together two rigid arms projecting from the steering knuckles of the front wheels of an automobile, whereby they are caused to turn in unison when one of them is operated by the steering wheel.

For proper steering of an automobile it is necessary to give the front wheels what is known as a "toe-in", i. e., the front wheels must be arranged in planes, not vertical and parallel, but in planes slightly converging toward the front. As the tie rod is rigidly connected to the opposite steering knuckles and as the front stub axles are also rigid therewith, it is apparent that in order to give the front wheels the proper "toe-in" under all conditions, some means of adjustment of the tie rod or joint connections is necessary. In the usual construction, in order to provide this adjustment, the tie rod is made of two end members and an intermediate member, which are relatively adjustable.

It is the object of this invention to reduce the present cost of such connection rods without sacrificing any other desirable characteristics, such as safety and adjustability.

To this end I employ a single bar in the ends of which I provide cavities adapted to receive the ball of a ball stud, with simple means readily to adjust the ball stud therein with relation to the intermediate portion of the rod.

The invention may be embodied in various forms, and hereinafter several forms are described, but they are to be considered merely as examples disclosing the principles involved.

In the annexed drawings:

Figure 1 is an elevation of a tie rod having axes of end adjustment sockets inclined at an angle of approximately 30 degrees with the axis of the rod;

Fig. 2 is an enlarged axial section through one of the adjustment sockets, on line II—II of Fig. 3;

Fig. 3 is a plan section on line III—III of Figs. 1 and 2 through one of the adjustment sockets;

Fig. 4 is a view similar to Fig. 1 of a tie rod having the adjustment sockets parallel to each other;

Fig. 5 is an enlarged axial section similar to Fig. 2 showing the axis of the adjustment socket at an angle of 45 degrees with the axis of the tie rod, but omitting the anti-rattle spring shown in the preceding figures;

Fig. 6 is an elevation, similar to Fig. 1, of a modified form of tie rod having axes of end adjustment sockets arranged parallel to the axis of the rod;

Fig. 7 is a partial plan view taken on line VII—VII of Fig. 6;

Fig. 8 is an enlarged axial section through the end of the adjustment socket shown in Fig. 7.

Fig. 9 is a view similar to Fig. 8, showing how the ball stud is inserted;

Fig. 10 is a view similar to Fig. 8 but omitting the anti-rattle spring;

Fig. 11 is an enlarged axial section through another modification in which the axis of the adjustment socket is coaxial with the axis of the rod.

Referring to the drawings in detail, which disclose the application of the invention to an automobile tie-rod, and in which the same reference numeral designates the same part throughout, a rod 1, preferably solid and of circular cross section, is provided at its ends with heads 2 which serve as housings for ball joints. These heads may have different relations to the rod 1 as will be hereinafter pointed out, but whatever the relative arrangement of the head with respect to the rod, the ball-joint is the same, and therefore but one of them need be described. The head 2 is elongated, presenting two end faces, and is provided with a threaded bore 3 through its major axis, to form a housing for a ball-joint, one wall of which is provided with an elongated opening 4. Within the housing is the ball 5 of a ball stud, the shank 6 of which extends through the opening 4 and forms a bearing for a connected part 7, preferably retained on the shank by a castellated nut 8 threaded onto the end of the shank, the nut being prevented from rotation by a cotter pin 9. The ball 5 is of less diameter than the bore 3, and is preferably of greater diameter than the width of the opening 4 in the housing. When made of greater diameter than the width of the opening 4 it is necessary to assemble the ball stud with the housing as illustrated in Fig. 9 by entering the stud, shank first, into the end of the bore and passing it upwardly through the opening 4.

In order to securely hold the ball stud in the housing, and provide for universal motion thereof in its seat and for longitudinal adjustment thereof with respect to an intermediate part of the rod 1, threaded plugs 10, 10a are engaged in the threads of the bore on opposite sides of the ball 5 and are retained in adjusted position by any suitable means, preferably by cotter pins 11 passing through apertures 12 in the wall of the housing (of which there are a plurality of sets), and through an elongated slot 13 in the outer end of the plug. The inner ends of the plugs may be provided with spherically curved recesses 14, forming a bearing surface for the ball 5, or the inner end of the plug may be flat, as indicated at 15 (Fig. 3), in which case a separate ball seat 16 is employed, between which and the plug 10a there is interposed an anti-rattling spring 17, adapted to take up wear in the ball joint. It is deemed preferable to use one plug 10 having a bearing surface at its inner end, and another plug 10a with its inner end face associated with a separate ball seat 16 and anti-rattling spring 17 so that wear in the joint may be taken up automatically.

The features above described are common to all the forms disclosed, but the head in which is formed the ball-joint housing may have different relations to the rod. As shown in Fig. 1 the axes of the bores in the heads 2 at opposite ends of the rod 1 are set at angles of 30 degrees to the axis of the rod and converge; as indicated in Fig. 4 they are set at the same angle but are parallel; in Fig. 5 the axis of the bore is at an angle of 45 degrees to the axis of the rod, while in Fig. 6 the axes of the bores are in the same plane but parallel with the axis of the rod. In the form shown in Figs. 1 to 5 the ball joint is always substantially in line with the rod 1, while in the form illustrated in Figs. 6 to 10 it is outside of this line, but in the latter form a given adjusting movement of the plugs 10, gives a maximum movement of the ball stud with respect to the rod 1, while the form shown in Fig. 5 would give the minimum movement. Where it is deemed desirable to adopt the form in which the axis of the bore 3 is at an angle to the axis of the rod 1, any angle may be selected which will provide the necessary adjustment in a longitudinal direction.

In Fig. 11 is disclosed a form in which the ball joint housing is co-axial with the rod 1. In this form the end of the rod 1 is provided with a threaded bore 18 in which the parts of the ball joint above described are placed as in the other forms. In this form only the inner plug need be modified, which becomes necessary because it must be adjusted through the opening 4 in the housing. To this end the inner end of the plug is provided with tool engaging means, such as recesses 19, formed in its inner end, which also serve the same purpose as slot 13 in the form previously described.

From the above description it will be apparent that the connecting rod and rod coupling having the features disclosed may be produced at a low manufacturing cost, that it provides the desired adjustment of the ball joint with relation to the rod in a simple way, and that it will be safe in use.

While I have shown several forms in which the disclosed principles may be embodied, it is to be understood that they are merely exemplary, and that considerable variation in embodiment may be made without departure from these principles. It is therefore to be understood that the invention is not confined to the details shown but includes all inventions comprehended within the terms of the appended claims.

What I claim is:

1. A ball and socket joint comprising a rod having an elongated head at one end with its axis in non-alignment with the axis of the rod, said head having a threaded bore extending axially therethrough and open at its ends forming a ball joint housing, the wall of the housing having an elongated opening, a ball stud having its ball in the housing with its shank extending through the elongated opening, threaded plugs provided with ball seats engaging in the threaded bore on opposite sides of the ball, and means for holding the plugs in any adjusted position therein.

2. A ball and socket joint including a rod having an angularly offset internally threaded socket member open at both ends and provided with an elongated opening in its wall, a ball stud having its ball within said socket with its shanks projecting through the elongated opening, a bearing in the socket for said ball and means for adjusting the ball in the socket including two threaded plugs located in opposite ends of the socket and engaging the threads thereof.

3. A ball and socket joint comprising a rod having an elongated head at one end with its axis at an angle to the axis of the rod, said head having an internally threaded bore extending axially therethrough and forming a ball joint housing open at both ends, the wall of the housing having an elongated opening, a ball stud having its ball in the housing with its shank extending through the elongated opening, threaded plugs provided with ball seats engaging in the threaded bore on opposite sides of the ball and means for holding the plugs in any adjusted position therein.

4. A tie rod, comprising an intermediate rod member, a head on one end of said member having a threaded bore and an opening in the wall thereof, a ball of a ball stud within said bore with its shank extending through said opening and plugs threadingly engaged in said bore on each side of said ball, said plugs having means accessible for adjustment of said plugs while said ball stud is in assembled position.

5. A tie rod, comprising an intermediate rod member, a head on one end of said rod member having a bore open at both ends and in non-alinement with the axis of said rod member, a ball of a ball stud within said bore and plugs adjustably positioned within said bore on each side of said ball and providing bearing seats therefor.

6. A tie rod, comprising an intermediate rod member, open ended converging ball sockets formed on the ends thereof, a ball of a ball stud within each of said sockets, and closure members in the open ends of said sockets to vary the distance between said balls.

7. A tie rod, comprising an intermediate rod member, ball sockets open at both ends and formed on the ends of said member, the axes of said sockets being out of alignment with the axis of the rod and at an angle to each other.

8. A tie rod, comprising an intermediate rod member, heads on the ends of said member having bores extending axially therethrough at acute angles to said rod axis, and a ball stud associated with each of said heads with its ball positioned in the bore thereof.

9. A tie rod, comprising an intermediate rod member, heads on the ends of said members having bores extending axially therethrough inclined with respect to said rod axis, a ball stud associated with each of said heads with its ball positioned in the bore thereof, and means for adjusting the distance between said balls.

10. A tie rod, comprising an intermediate member, heads on the ends of said member, said heads having bores extending axially therethrough to provide ball sockets, the axes of said bores intersecting the axis of said intermediate member and of each other.

11. A tie rod, comprising an intermediate member, heads on the ends of said member having bores extending axially therethrough to provide ball sockets, the axes of said bores lying at acute angles to the axis of said member, a ball stud associated with each of said sockets, and members adjustably secured in said bores for adjusting the relative positions of said ball studs.

12. A tie rod, comprising an intermediate rod member, heads on the ends of said member, said heads having threaded bores open at their ends and extending axially therethrough, the axes of said bores lying at acute angles to the axis of the intermediate rod member, ball studs adjustably mounted in said bores, and means threaded into said bores for adjusting the balls with respect to each other.

13. A tie rod comprising an intermediate rod member, heads on the ends thereof having threaded bores open at their ends and extending axially therethrough, the axes of said bores lying at acute angles to the axis of said intermediate rod member, ball studs adjustably mounted in said bores and closure members for said bores threadingly engaged therewith for effecting the adjustment of said ball studs.

Signed by me this 12th day of February, 1926.

FREDERICK C. CRAWFORD.